United States Patent [19]

Murfae et al.

[11] Patent Number: 5,133,619
[45] Date of Patent: Jul. 28, 1992

[54] STORM WATER FILTRATION SYSTEM FOR USE WITH CONVENTIONAL STORM WATER COLLECTION SEWERS

[76] Inventors: George W. Murfae, 4105 Bennedict, Austin, Tex. 78746; Pix D. Howell, 8613 Montevista Cove, Austin, Tex. 78736

[21] Appl. No.: 671,100

[22] Filed: Mar. 18, 1991

[51] Int. Cl.⁵ .............................................. E01C 11/22
[52] U.S. Cl. ............................................. 404/4; 404/5
[58] Field of Search ................................. 404/2, 3, 4, 5

[56] References Cited

U.S. PATENT DOCUMENTS

| | | | |
|---|---|---|---|
| 809,201 | 1/1906 | Lutz | 404/4 X |
| 1,108,852 | 8/1914 | Scheuermann | 404/4 |
| 1,654,247 | 12/1927 | Egan | 404/4 X |
| 4,419,232 | 12/1983 | Arntyr et al. | 404/5 X |

Primary Examiner—William P. Neuder

[57] ABSTRACT

A filter assembly for storm water sewer is provided in an alternative run-off path between the ground to be drained and the storm water sewer so that if the filter assembly is flooded, storm water can still drain to the sewer. The filter assembly preferably comprises a metal filter basket removably housed in a basin disposed upstream from a conventional storm water receiving basin. The basket contains dischargeable filtration media and lifting channels which enable the basket to be removed from and inserted into the basin by the tines of a conventional waste disposal vehicle.

6 Claims, 3 Drawing Sheets

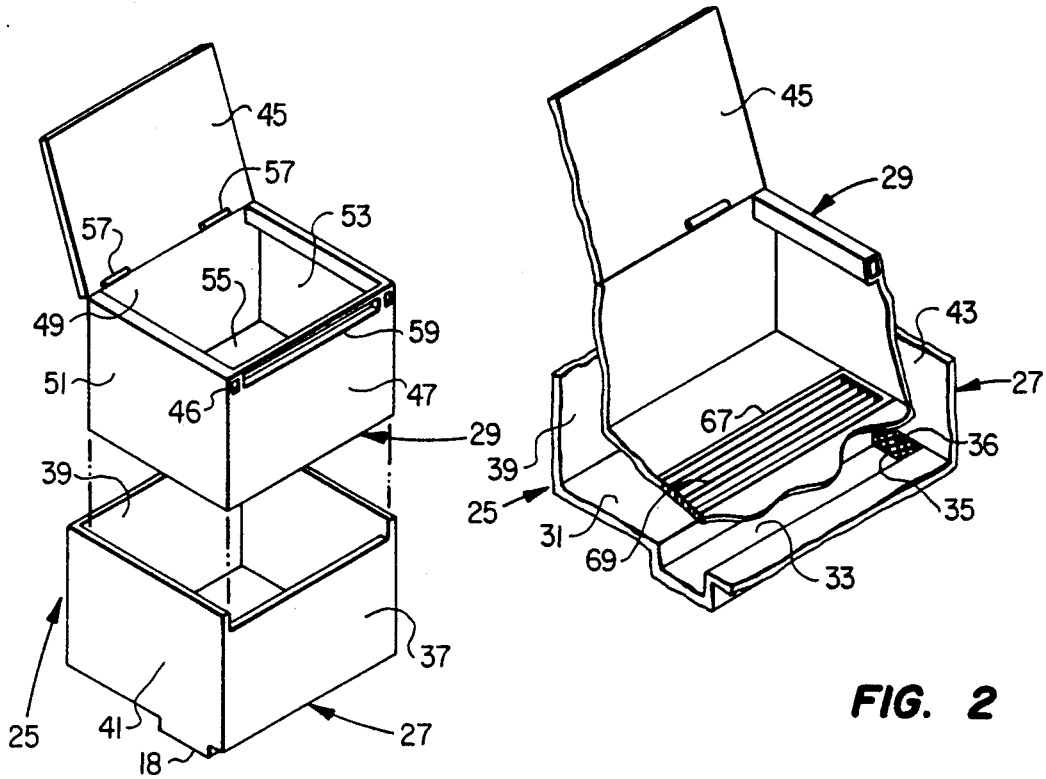
FIG. 1
FIG. 2
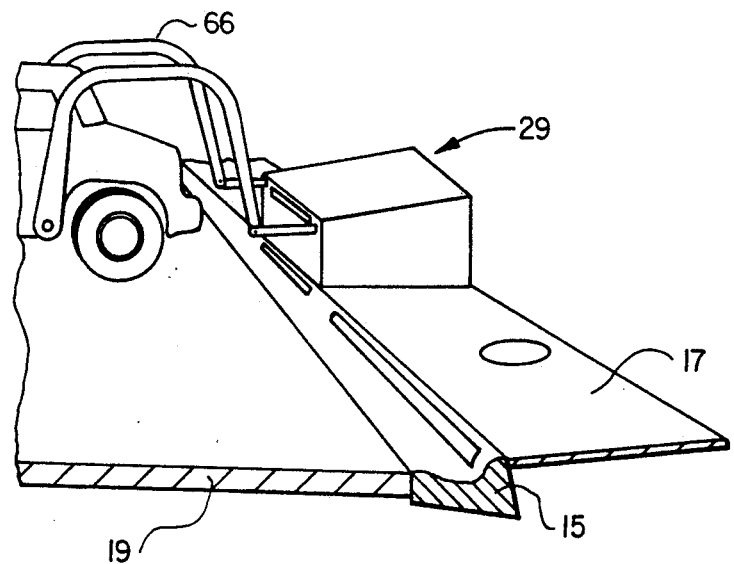
FIG. 3

STORM WATER FILTRATION SYSTEM FOR USE WITH CONVENTIONAL STORM WATER COLLECTION SEWERS

I. FIELD OF THE INVENTION

The present invention relates to a storm water filtration system for use with conventional storm water collection sewers. The filtration system is designed for installation within a right-of-way, e.g., behind the curb of a street, or within the inlet storm system of a parking area. Treated storm water from the system will discharge to existing, conventional inlets and storm sewers. The filtration system will treat storm water runoff without blocking or inhibiting the evacuation of storm water through the sewer, therefore avoiding any possible liability due to flood damage.

II. DESCRIPTION OF THE PRIOR ART

Presently, storm water is collected through a series of grated or recessed inlets placed in pavement and/or curb sections, and then conveyed via storm sewer piping to an outfall in an existing drainage way or stream. There is no treatment or attempt to remove sediment, trash or other pollutants. This arrangement quickly conveys storm water away from structures and property and avoids water or flood damage and protects life and limb. However, it also contributes to the pollution of surface and subsurface water supplies: oils, greases, solvents, sediments, trash, etc., are washed from impervious areas, such as streets and parking lots, as well as storage yards rooftops, etc., by the storm water and are discharged with that water into streams, lakes and ground water recharge areas, contributing to the accumulative pollution of the water supply. Moreover, the sight of waste material, such as food and beverage containers, floating on streams and waterways is a visible reminder to the public of contamination and pollution of the water supply.

There are large urban areas where development has progressed to a point where storm runoff is conveyed entirely across pavement, roof tops and parking lots, without the benefit of the natural filtering which occurs when storm water runs over grasslands or vegetated areas. Because of the density and value of development in these urbanized areas, it is important to remove the storm water and avoid water/flood damage liability. Moreover, given that rainfall amounts of up to eight inches an hour can occur, removal must be accomplished quickly and unfailingly. It is, therefore, unacceptable to place filter apparatus in storm water conveyance ways because of the risk of overloading/plugging and resultant inhibition of flow.

The prior art contains disclosures of sewage systems in which filters are provided to prevent sediment and solid waste materials entering the main sewer line and some of these include a removable basket in which the filtered-out solid material is retained to facilitate cleaning and replacement. However, in the prior art, the filters are essentially in line with the main flow of water into the sewer and so, when full, can obstruct the flow of water and cause flooding or damage.

U.S. Pat. No. 658,639 (Guion) discloses a receiving basin for a sewer system which is divided by a vertical screen G into compartments A and H. A removable metal basket I is normally housed in compartment A and incoming water is directed into that basket I, which retains sediment. Water can pass through foraminous sides of the basket I into the compartment H of the basin which contains filtration material and hence to the sewer.

U.S. Pat. No. 664,945 (Guion) discloses a kitchen sink comprising a chamber formed by a casing 7 mounted below the sink and housing a removable filter vessel 11 into which the sink discharges. The filter vessel 11 is foraminous to allow water to pass through it to an outlet for the chamber and thence to a receptacle 15 from which a siphon withdraws it to the drain.

U.S. Pat. No. 1,746,121 (Levy) discloses a catch basin for a sewer in which the basin 12 is provided, between its inlet 10 and the sewer, with a removable basket 16 into which incoming water is directed and which retains solid materials.

U.S. Pat. No. 809,201 (Lutz) discloses a receiving basin for a sewage system that receives surface water from streets. The receiving basin is intended to catch sediment in the water and prevent it from being carried into the sewer. The basin houses a removable basket B into which incoming surface water is directed. The basket B has a main, screened opening Q through which surface water passes from the basket through the basin, and subsidiary outlets R and S. Subsidiary outlet S allows water to escape around the basket if the basket is full of sediment.

U.S. Pat. No. 2,615,526 (Lane) discloses a catch basin for a sewer which is provided with a removal filter basket B formed of a screen 27, angle irons 24 and 25 and sheets 28 and 29.

U.S. Pat. No. 2,102,310 (Egan) discloses a removable receptacle 4 for insertion within a receiving basin of a sewer. The receptacle 4 has a spiral arrangement of discharge ports through which incoming water can flow to the sewer.

U.S. Pat. No. 4,419,232 (Arntyr) discloses a filter device for outdoor drains in roadways, etc., comprising a grating 12, below which is mounted a course-filtering, wire basket 2 and below that a fine filtering bag 3 of flexible water-permeable cloth or fabric.

U.S. Pat. No. 4,793,728 (Ellis) discloses a subsurface water drainage system comprising a fabric filter tube 18 arranged parallel to a pavement 14 to be drained and connected at its discharge end 34 to the main sewer.

III. OBJECTS OF THE PRESENT INVENTION

It is an object of the present invention to overcome both the lack of filtration and the danger of inhibiting the removal of storm runoff existing under present arrangements.

It is a further object of the invention to provide a system for removing trash, and other pollutants from storm water run-off without the use of extensive acreage devoted to slow sand filter treatment beds, which could require one-half acre of filter bed to treat each 30 acres of storm receiving land. This size filter bed is expensive to provide, particularly in urban areas.

IV. SUMMARY OF THE PRESENT INVENTION.

The present invention provides a storm water filtration system for use with conventional storm water collection sewers, including an inlet filtration system comprised of a filter basin, a removable filtration basket housed within the basin and ancillary connections to the conventional storm collection system. The inlet filtration system would be placed upstream of the conventional storm water inlets.

The filter basin is preferably poured in place and is configured to drain to the conventional storm inlet via an outlet in the basin and a pipe connector. The filter basin may have a recessed cavity upstream of the outlet, which may house a removable filter cartridge. This optional filter cartridge is of a material selected to remove particular storm water constituents, such as solubilized organic or inorganic pollutants.

The filtration basket holds the filter media, is perferably constructed of metal and is adapted to receive a forklift assembly of a conventional waste-disposal collection vehicle. The basket has a hinged metal lid arranged to swing open when the basket is inverted over the waste-disposal vehicle's waste holding cavity. The configuration of the filter basin and therefore the weight/volume of the anticipated load controls the material and strength requirements of the basket.

The filtration system of the present invention is installed adjacent to storm water inlets to provide a level of treatment of the storm water runoff prior to its discharge to a storm sewer. The filtration systems of the present invention will normally be constructed to discharge to the conventional basin of a storm sewer, though in certain applications it may be desirable to discharge directly into the sewer line downstream of the storm sewer inlets. As storm sewer inlets are also located at low points, it may be necessary to locate filtration systems on both sides of a sewer inlet.

The installation of the invention in existing urbanized areas will require removal of existing curb, sidewalk and pavement. The structure will be located adjacent to the existing inlet and is designed to discharge directly to the inlet. Therefore, the installation will require cutting into the existing inlet for the physical connection, or designing new inlets to incorporate this unit.

In general, the installation of a sufficient number of these filtration systems would greatly enhance the quality of the runoff from urbanized watersheds.

V. BRIEF DESCRIPTION OF THE DRAWINGS

The invention will now be described, by way of example only, with reference to the accompanying drawings, wherein like reference characters refer to like parts throughout the several views, and in which:

FIG. 1 is an exploded perspective view of a storm-water filter assembly embodying the invention;

FIG. 2 is an exploded and sectional rendering of the interior features of the embodiment shown in FIG. 1;

FIG. 3 shows schematically the installation and maintenance of the embodiment shown in FIGS. 1 and 2;

VI. DETAILED DESCRIPTION OF THE PREFERRED EMBODIMENT OF THE PRESENT INVENTION

Figure 5:
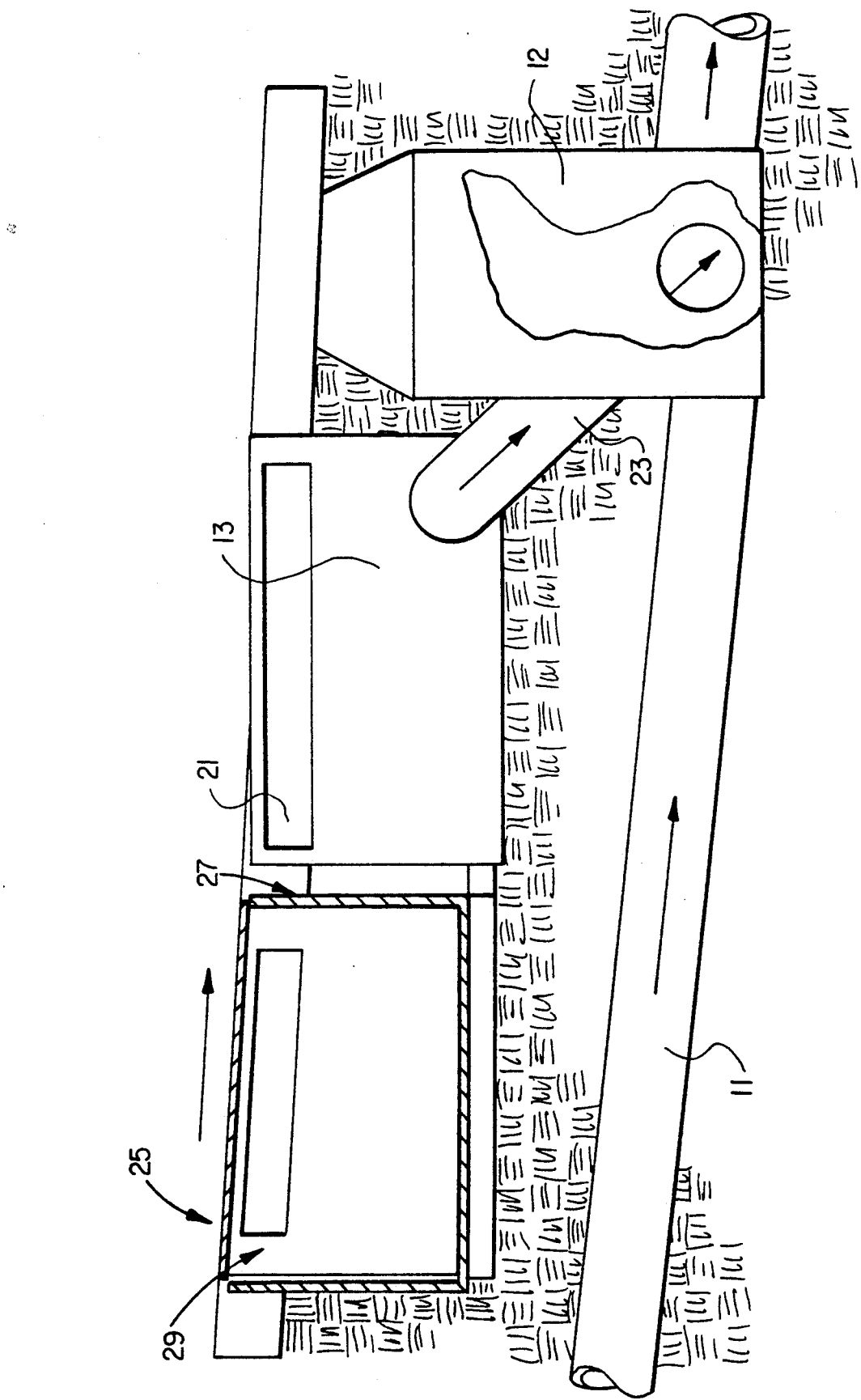
FIG. 5 is a cut-a-way view showing the embodiment of FIGS. 1 and 2 installed adjacent to a conventional storm sewer system.

In FIG. 5, a conventional below-ground storm sewer line 11 receives runoff water from a below-ground receiving chamber 12, which, in turn, is fed by a receiving basin 13 installed below ground, e.g., adjacent to a curb 15 and under the pavement 17 of a road 19 (see FIG. 3). The receiving basin 13 has an upper inlet 21, which receives runoff water from the roadway 19 and as lower outlet 23 communicating with the receiving chamber 12 for transmitting the runoff water to the sewer line 11.

A filter assembly 25 embodying the invention, and best seen in FIGS. 1 and 2, is mounted below the roadway 19 adjacent to the receiving basin 13, preferably on the upgrade side of the basin 13. The filter assembly 25 comprises a concrete, poured-in situ, basin 27 providing an open-topped chamber in which is accommodated a removable filter basket 29.

Figure 6:
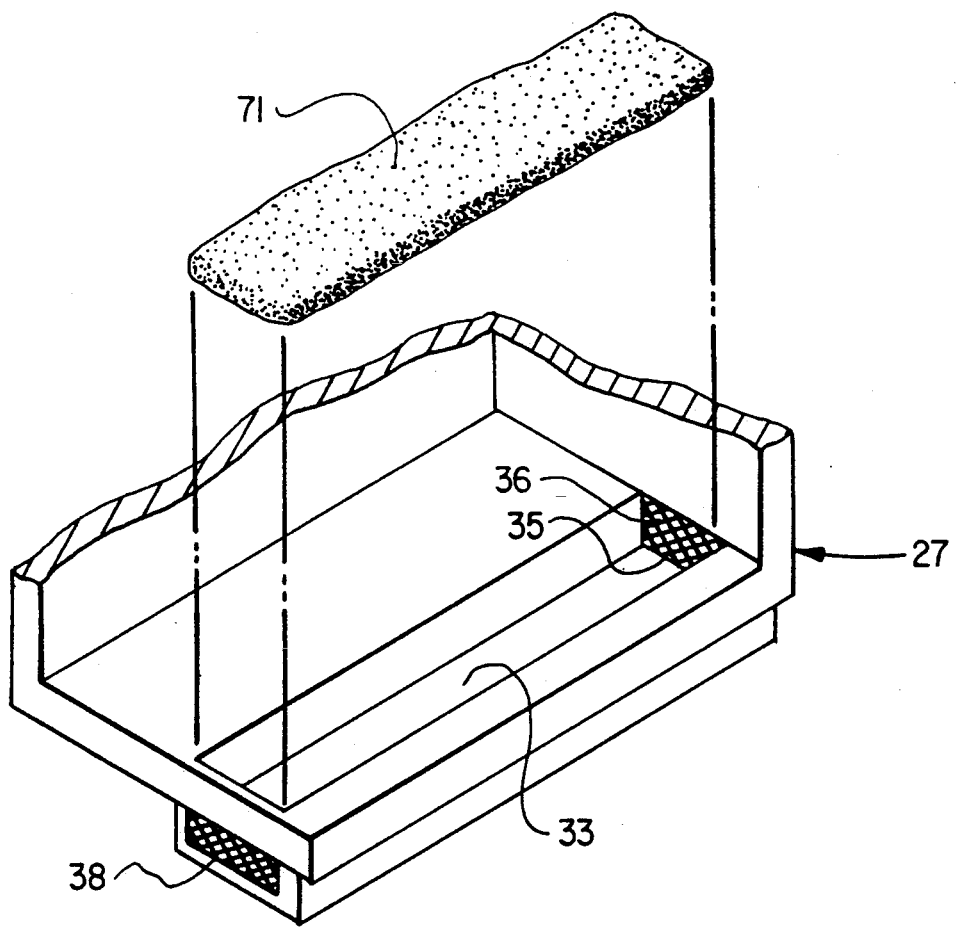
FIG. 6 is a perspective view of the lower parts of the embodiment shown in FIG. 2.

The basin 27 has a bottom wall 31 in which is formed a downwardly disposed chamber 33, having at one or both of its ends an opening 35 below the bottom wall 31 which provides an outlet from the basin 27. A screen 36 is mounted in the, or each, opening 35. Optionally, the other end of the chamber 33 may have a second screened opening 38 (FIG. 6) for a purpose described below.

The basin 27 further comprises front, back, left and right side walls, 37, 39, and 41 and 43, respectively, disposed essentially vertically. An upper portion of the front wall 37 is omitted, for a purpose described below.

Within the basin 27 is removably housed the filter basket 29, which comprises essentially a metal box, having a lid 45, front, back and side walls 47, 49, 51 and 53, respectively, and a base 55. The lid 45 is advantageously of steel and is connected to the back wall 49 by, e.g., a pair of hinges 57, which are welded to the wall 49 and lid 45. An upper portion of the front wall 47 is omitted to form a slotted opening 59, which is in register with the upper omitted portion of the front wall of the basin 27 when the basket 29 is housed in the basin 27 and provides a water inlet to the basket 29 and basin 27. The upper edge of the front wall 47 provides a support for the lid 45 when the lid 45 is closed.

Figure 4:
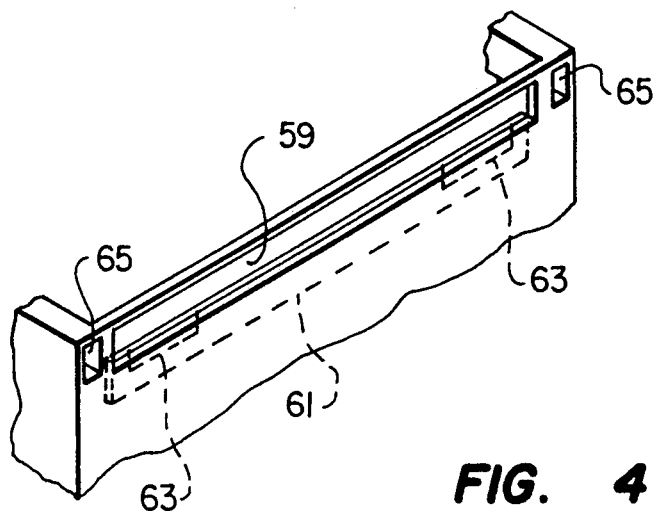
FIG. 4 is a detailed perspective view of the trash trap door of the embodiment shown in FIGS. 1 and 2.

A trap door 61, see FIG. 4, preferably formed of a light, buoyant plastics material, is hinged, as at 63, to the interior of the front wall 47 of the basket 29 for closing the opening 59.

Two lifting channels 63 and 65 are provided along the upper edges of the side walls 51 and 53 of the basket 29 and are open at their front ends to allow the basket 29 to be engaged by the tines of a conventional solid waste collection vehicle 66 for installation and removal, as shown in FIG. 3.

The base 55 of the basket 29 has an opening 67, FIG. 2, which is in register with the channel 33 when the basket 27 is installed in the basin 13. A grill 69 extends across the opening 67 to prevent large, solid debris from passing through it. A filtration media (not shown) of, for example, washed, course, sand, gravel or sand/gravel mixture is contained within the basket 29 and a replaceable filter cartridge 71, FIG. 6, e.g. of activated carbon, or resin bead mixture, is housed in the chamber 33 below the grill 69.

If the water level in basket 27 rises, the trap door 61 floats on the surface of the water and eventually closes the opening 59, preventing backwash of solid materials collected in the basket 27. When the trap door 61 is closed, or flow through the filter assembly is otherwise obstructed, storm water runs past the opening 59 of the assembly 25 and passes directly to the receiving basin 13, so there is no risk of the filter assembly 25 causing flooding when it is too full to allow passage of water through it.

At a suitable time, the basket 29 is removed from the basin 27 by means of the conventional waste-disposal collection vehicle 66 (FIG. 3), the tines of which can be inserted into the lifting channels 63 and 65. Thereafter, the basket 27 is lifted from the basin 29 and inverted over the vehicle receptacle. The debris and spent filtration media fall past the open lid 45 into the vehicle 66. Thereafter the basket 29 can be recharged with fresh filtration media. Also at this time, the channel 33 in the basin 27 is exposed to enable the filter cartridge 71 to be replaced also.

The sand or other filtration media 69 removes large, floating items of trash, such as paper, cardboard, cigarette butts, and larger suspended solids, such as grit, salts and disintegrated motor tires. The filter cartridge 71 is intended to remove pollutants dissolved, or intimately mixed into the sewer water, such as motor oils and greases, or improvidently discharged chemicals. If the location at which the filter assembly 25 is to be installed is known to be at risk from a particular pollutant, e.g. motor oils and greases, the filter cartridge 71 can be selected to target that particular pollutant.

Several of the filtration assemblies 25, as described, can be used in sewers along, e.g., a roadway, each receiving the storm water from a particular section of roadway. The outlets 35 of each basin 27 can be connected to a common pipe communicating with the receiving basin 13. Alternatively, using the embodiment shown in FIG. 6, the assemblies 25 can be arranged in series with the outlet 35 of each chamber 33 connected to the screened opening 38 of the chamber 33 of the next down-stream assembly 25.

The assembly 25 can be retrofitted to existing systems with minimal expense, requiring only the excavation of part of the sidewalk, curb and pavement and no acquisition of new land. Certainly, the assembly 25 is a considerably more economic use of land than the provision of the filtration beds for the treatment of storm water.

We claim:

1. In a storm water sewage system comprising a below-ground receiving basin having an inlet for receiving water from the ground surface and an outlet for transferring the water from the basin to the sewer line, the improvement consisting of a below-ground filter assembly located adjacent to the receiving basin and having an inlet for storm water runoff, an outlet from which storm water runoff passes to the sewer line, and filter material in the filter assembly through which storm water runoff water must flow to pass from the inlet to the outlet, the filter assembly providing an alternative path for storm water runoff to reach the sewer line and/or conventional storm water inlet without obstructing the path via the receiving basin.

2. A system as claimed in claim 1 wherein the outlet of the filter assembly delivers storm water to the interior of the receiving basin.

3. A system as claimed in claim 1 wherein the filter assembly comprises a below-ground basin, a filter basket containing filter material removably mounted in the basin, an inlet for the assembly upstream of the filter material and an outlet downstream thereof, said outlet communicating with the sewer line for dispersal of storm water.

4. A filter assembly for use in a storm water sewer system comprising a below-ground basin, a filter basket containing filter material removably mounted in the basin, an inlet for the filter assembly upstream of the filter material and an outlet downstream thereof, said outlet communicating with the sewer line for dispersal of storm water wherein the inlet of the filter basket has a closure member disposed within the interior of the basket adapted to float on the surface of water contained in the basket and to close the inlet when the level of the water therein rises to a level at which backwash of retained solid material would occur.

5. An assembly as claimed in claim 4 wherein the basin has a portion which accommodates a filter cartridge and the basket contains particulate filter material.

6. An assembly as claimed in claim 4 wherein the basket has a hinged lid face to open under gravity when the filter basket is inverted.

* * * * *

UNITED STATES PATENT AND TRADEMARK OFFICE
CERTIFICATE OF CORRECTION

PATENT NO. : 5,133,619

DATED : July 28, 1992

INVENTOR(S) : George Murfee, et. al.

It is certified that error appears in the above-identified patent and that said Letters Patent is hereby corrected as shown below:

On the Title page change the inventor's name from "Murfae" to -- Murfee --;

change Assignee's name from "Murphy" to -- Murfee --;

Signed and Sealed this

Twenty-sixth Day of January, 1993

Attest:

STEPHEN G. KUNIN

*Attesting Officer*    *Acting Commissioner of Patents and Trademarks*